United States Patent [19]
Schultz

[11] Patent Number: 5,479,006
[45] Date of Patent: Dec. 26, 1995

[54] POSITIONING SKEW COMPENSATION FOR IMAGING SYSTEM USING PHOTOCONDUCTIVE MATERIAL

[75] Inventor: John C. Schultz, Afton, Minn.

[73] Assignee: Minnesota Mining and Manufacturing Company, St. Paul, Minn.

[21] Appl. No.: 288,447

[22] Filed: Aug. 10, 1994

[51] Int. Cl.$^6$ ........................................... H01J 40/14
[52] U.S. Cl. ............................ 250/214 LA; 250/559.37
[58] Field of Search ................. 250/214 LA, 214 C, 250/557, 563, 559.37; 382/44, 61, 17; 358/496, 300, 488, 302, 412, 435, 453, 456; 347/134, 140, 119, 138

[56] References Cited

U.S. PATENT DOCUMENTS

| | | | |
|---|---|---|---|
| 4,176,275 | 11/1979 | Korn et al. | 250/214 LA |
| 5,268,569 | 12/1993 | Nelson et al. | 250/214 LA |
| 5,374,993 | 12/1994 | Diehl et al. | 358/300 |

*Primary Examiner*—Edward P. Westin
*Assistant Examiner*—Que T. Le
*Attorney, Agent, or Firm*—Gary L. Griswold; Walter N. Kirn; Steven J. Shumaker

[57] ABSTRACT

A system for compensating for positioning errors in the scanning and digital readout of latent electrostatic images on a photoconductive structure. The photoconductive structure is placed in a cassette or other holder positioned with respect to the readout scanner, which scans across the photoconductive structure in scan patterns of successive pulsed laser spots which will correspond to the pixels of the image. Elongated strip electrodes and charge amplifiers receive charge movements due to the pulse spots of the scanner. The photoconductive structure preferably has a reference strip which can be sensed by the scanner to provide a measure from a standardized Optical Start of Scan, and the Plate Start of Scan. This measurement, referred to as line skew, is a measure of the positioning errors, which will cause displacement of the scan patterns of pulse spots from their expected positions with respect to the elongate strip electrodes. This system provides skew compensation to determine which electrode and which adjacent electrodes correspond to specific scan spots, so that the charge movements received thereby can be properly combined to form the correct charge value for the image pixel represented by each scan spot. In a preferred embodiment, the measurements taken by the skew measurement circuitry are filtered to provide a smoothed measurement of the skew for each line and the incremental skew per line.

20 Claims, 4 Drawing Sheets

POSITIONING SKEW COMPENSATION FOR IMAGING SYSTEM USING PHOTOCONDUCTIVE MATERIAL

TECHNICAL FIELD

This invention relates to systems for producing images using photoconductive structures which absorb radiation to form a latent image, followed by scanning and digital readout of the image. In particular, the invention pertains to a system and method for compensating for errors in the positioning of a photoconductive structure with respect to the scanning readout apparatus. It is particularly adapted to the field of digital radiography.

BACKGROUND OF THE INVENTION

One type of imaging system uses photoconductive material to absorb incident radiation and to form and hold a latent image of an object, in the form of a distribution of charge carriers. Readout of the latent image and conversion of it to electronic form is achieved by scanning a narrow beam of radiation across the photoconductive material, and detecting the motion of charges caused thereby. The charge movements for each scanned spot (which represent the pixels of the scanned image) are received by an electrode, integrated and digitized in an appropriate form to be used to create a digital representation of the latent image. An example of this type of system is disclosed in U.S. Pat. No. 4,176,275 (Korn et al.).

Because of the amount of time involved in charge migration and collection for each spot illuminated by the scanning beam, the time period for scanning and processing of images from large photoconductive structures can be considerable. This is especially true when the overall system resolution is very high, creating a very large number of pixels. The system disclosed in U.S. Pat. No. 5,268,569 (Nelson et al.) provides improvements in scanning speed by using a plurality of elongated parallel strips as the readout electrodes, with the strips connected respectively to a plurality of charge amplifiers. Using this system, a scan line can be spread across the electrodes in a space and time pattern in such a manner as to allow for charge migration and detection time at each strip electrode-amplifier, before the scanning beam returns to the electrode. Although this system does provide improvements in performance, certain problems can be encountered in the practical application of these principles to high performance, high resolution imaging systems.

Because of transverse migration or diffusion of charges within the photoconductive material, it cannot be assumed that all of the charge movement caused by a particular readout scan spot will be collected by the electrode strip immediately underneath the spot. This is especially true if the spot in question is close to a boundary between adjacent electrode strips. It is therefore necessary to collect charge movements from the strip electrode beneath the spot, and also from any electrode close enough to receive some of the charge, and to combine the charges collected by such electrodes, in order to get an accurate representation of the value of the scanned spot, or pixel. In other words, a scanned spot on the photoconductive surface, which is to correspond to a defined pixel of the latent image being scanned, does not provide a one-to-one correspondence with charge received by the electrode strip beneath the spot. It may be necessary to receive charge at one or more adjacent electrodes also, and to combine them in order to obtain the correct value for the pixel corresponding to the scanned spot.

Another problem in the practical application of such systems can arise from errors in the positioning of the photoconductive structure relative to the scanning-readout apparatus. In one type of system, the photoconductive structures which have previously been exposed with radiation to form the image thereon, are placed in some type of holder or cassette in a scanning structure, for readout and image digitization. Due to small tolerances in various parts of the system, a photoconductive structure, and in particular its plurality of elongated strip electrodes, may not be positioned exactly in the nominal or intended position with respect to the scanning apparatus. This may result in the pattern of scan spots being displaced from their expected positions with respect to the strip electrodes in the photoconductive structure. Such misalignment, for example, could result in a given pixel being scanned on the photoconductive structure atop the neighboring electrode strip, rather than the expected or nominal one. Also, such positioning errors could result in the displacement of a given scan pixel such that, while it still overlies the nonfinal or intended electrode strip, its position is shifted so that the identity of the closest adjacent strip switches sides. These effects must be compensated for if the proper electrodes are to be used in integrating and combining charges to obtain the correct pixel value for a scanned spot.

While tolerances can be held to close values through careful design and manufacture of the photoconductive structure, cassette and scanning apparatus, it is not practical to eliminate them completely, because of the very tight tolerances involved, especially in the case of very high resolution systems with correspondingly small pixel size and narrow electrode strips. It is therefore important to provide a way to measure and compensate for the expected errors.

DISCLOSURE OF THE INVENTION

The invention is a system for compensating for positioning errors, referred to herein as skew, between a photoconductive structure holding a latent image and having a plurality of elongate thin readout electrodes, and a readout scanner. The photoconductive structure is placed in a cassette or other holder positioned with respect to the readout scanner. The readout scanner scans across the photoconductive structure in scan patterns of successive pulsed radiation spots which will correspond to the pixels of the image. Detection circuitry is connectable to the elongate strip electrodes for receiving and storing signals representing the charge movements received by the various electrodes due to the pulse spots of the scanner. The detection circuitry includes multiple channels, and controls synchronized with the scanner, so that channels associated with an electrode strip under the expected or nominal position of a scan spot, and preferably at least one adjacent electrode, are operative for receiving charge movements caused by a scan spot. These received values are stored in memory for subsequent processing. The photoconductive structures preferably have a reference mark at a known position thereon with respect to the positioning of the elongate strip electrodes. In a preferred embodiment the reference is a line adjacent an edge of the photoconductive structure. The system of the invention includes skew measurement circuitry which is connected to measure the distance between the nominal start of a scan line pattern of the scanner and the reference mark on the photoconductive structure. This is measured at a plurality of locations along the photoconductive structure, and provides a measure of the skew of the positioning of the photoconductive structure in the support and resulting displacement of the scan patterns of pulse spots from their expected positions with respect to the elongate strip electrodes. This system provides skew compensation means responsive to the skew measurement circuitry, and operative to provide an indication of which electrode and which adjacent electrodes correspond to specific scan spots, so that the previously stored charge movements received thereby can be properly combined to form the correct charge value for the image pixel represented by each scan spot. In a preferred embodiment, the measurements taken by the skew measurement circuitry are filtered to remove noise and provide a smoothed measurement of the skew for each line and the incremental skew per line, due to offset or rotation errors in positioning of the photoconductive structure.

DETAILED DESCRIPTION OF THE INVENTION

Figure 1:
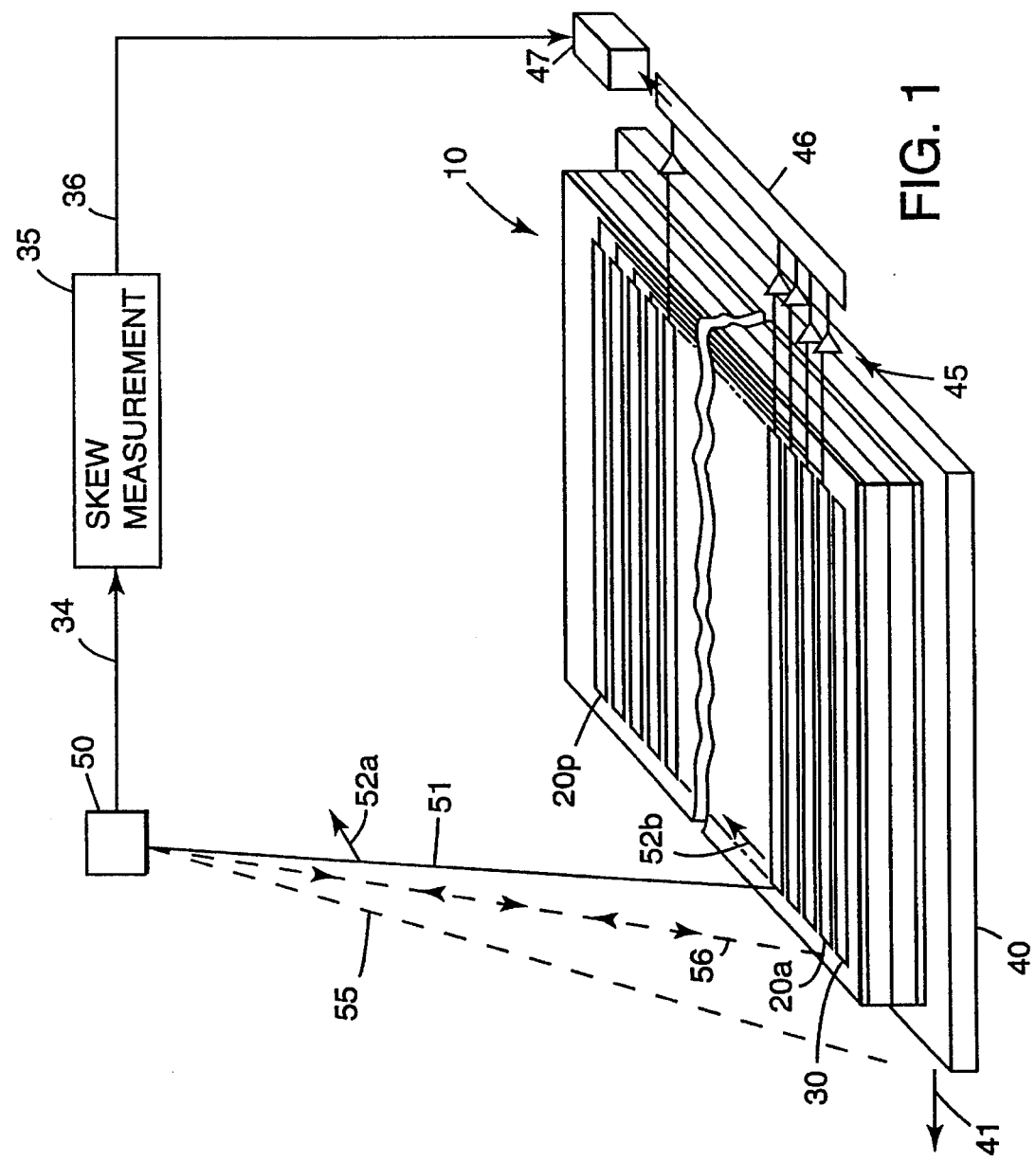
FIG. 1 is a schematic representation of the scanning of a photoconductive structure utilizing the system of the present invention.

In FIG. 1, reference number 10 generally designates a photoconductive structure which is positioned for scanning by a scanning head assembly 50. The general idea is to scan the latent image on the photoconductive surface through the patterns of scan spots (pixels) as discussed below, to collect the charge movements caused by each scan spot by electrodes and amplifiers, and to store the values of charge received by the amplifiers in memory in a data processing system. It is also necessary to combine charges received on adjacent electrodes which may be due to charge movements caused by a single scan spot near the boundary between adjacent electrodes. To do this, the invention provides a measurement of skew, which can then be used for determining which of the stored charge movement values should be combined to obtain the correct value of the charges corresponding to each pixel. Digital computational and graphical techniques may then be used to produce a visible digital representation of the latent image which had been formed on the photoconductive structure.

Photoconductive structure 10 may be generally of the type described in previously mentioned U.S. Pat. No. 4,176,275 to Korn et al., and U.S. Pat. No. 5,268,569 to Nelson et al., which are incorporated by reference herein. Photoconductive structure 10 is a multi-layer device and includes a plurality of elongated strip electrodes, positioned parallel and adjacent to each other, and substantially covering the photoconductive structure. For purposes of clarity of the illustration, only a small number of electrodes are shown in FIG. 1, starting with electrode 20a, and extending through electrode 20p. It will be understood that the number of electrodes used will depend upon the size of the photoconductive structure. Photoconductive structure 10 also includes a reference strip 30, preferably positioned along one side thereof, in known relationship to the beginning of the electrode array 20a–20p. Reference strip 30 is preferably a reflective material used in establishing the plate start of scan, as explained in greater detail below. Since reference strip 30 is formed by lithographic techniques on photoconductive structure 10, its position with respect to the elongate electrodes, and specifically the first one, 20a, can be accurately controlled.

In the process of scanning and readout of a latent image, the photoconductive structure 10 is placed on a holder or cassette 40, as suggested diagrammatically in FIG. 1, for placement in a scanning apparatus beneath a scanning head 50. In practical application, holder 40 would be designed, in conjunction with photoconductive structure 10, to receive and hold the photoconductive structure 10 in a known registration with respect to the scan pattern generated by scanning head 50. However, in practice there may be positioning errors due to mechanical tolerances, and the present invention is intended to compensate for these errors.

Scanning head 50 generates a narrow beam of radiation which is indicated by reference 51, which can be moved across photoconductive structure 10, as suggested by direction arrows 52a, 52b. The direction of the scan is generally transverse to the tong dimension of electrodes 20a– 20p. Holder 40 is attached to a drive mechanism (not shown) in the scanning apparatus to slowly move photoconductive structure 10 in a direction generally transverse to the scan 52a,b and longitudinally of the orientation of electrodes 20 a–20p. In this manner the entire image surface of photoconductive structure 10 can be scanned by a combination of the scanning movement of the scanning radiation beam 51, and relative motion of the holder 40 with respect to head 50 as indicated by arrow 41.

In the preferred embodiment the scanning radiation beam 51 is a pulsed laser beam having a very narrow diameter so that an individual scan spot produced by a pulse of the laser will correspond to the pixel size of the image being scanned and digitized. The laser beam 51 is not operated continuously, but is pulsed in scan patterns, as explained hereinafter, across the electrodes.

Also shown in FIG. 1, are dotted lines 55 and 56 which show the positions of the laser beam at two other points of interest with respect to the compensation system of the present invention. Dotted line 55 shows the path of the beam at the optical start of scan (OSOS) as will be explained further below. Dotted line 56 shows the position of the scanning laser beam at the plate start of scan (PSOS) which is when the scanning beam first contacts reference strip 30. These positions of the beam, and their use in the measurement and compensation technique of the present invention, are explained further below.

When photoconductive structure 10 is placed in holder 40, connections are also made between a plurality of charge amplifiers, indicated by reference number 45, and an individual one or groups of the strip electrodes 20a– 20p. The charge amplifiers are used for receiving the charge signals collected by the strip electrodes, as a result of charge movements caused by the radiation 51 striking the photoconductive structure 10 for each pixel. While it is possible to provide a separate charge amplifier 45 for each electrode strip 20, in practice it is advantageous to provide a number of amplifiers less than the total number of strips, and then connect them through appropriate connections or switches so that individual amplifiers can be used with separate electrode strips from different zones on the photoconductive structure. In this manner, individual amplifiers can be collecting or receiving charge signals during scanning of the portion of the image above or adjacent an electrode, then can be readout with the values collected by the electronics during a further interval, and then can be operative to receive charges from another electrode from a different area of the image during a further interval. Details of the charge amplifier arrangement, and the switching thereof to cover multiple electrodes, is detailed in copending U.S. patent application entitled "Imaging System Employing Effective Electrode and Processing", Ser. No. 08/221,687, filed Mar. 31, 1994, by Owen L. Nelson and Frederich R. Kroeger, which is hereby incorporated by reference.

The charge amplifiers 45 connect over a data bus or interconnect network 46 to a data processing system 47, which includes memory for receiving and storing signal values produced by the various charge amplifiers in different intervals of time.

While different types of scanning apparatus can be used, in the preferred embodiment a rotating polygon mirror scanner is used to sweep the position of scanning beam 51 across the photoconductive structure in the direction 52b indicated generally transversely to the longitudinal dimension of strip electrodes 20. Although the path of the laser beam may be swept in a continuous motion across the image area, it is not continuously on, but is pulsed in patterns of pixels as its position is moved across the image. The pulsing is controlled to produce the pixel distribution in sub-scans across the electrodes as explained hereinafter. The preferred embodiment of the scanning head 50 is disclosed and claimed in copending U.S. patent application entitled "Radiographic Image Reader", Ser. No. 08/221,191, filed Mar. 31, 1994, by James E. Steffen et al., which is hereby incorporated by reference.

While a preferred photoconductive structure is in the form of a plate, it will be appreciated that this is not a requirement, and that other shapes can be used.

Figure 2:
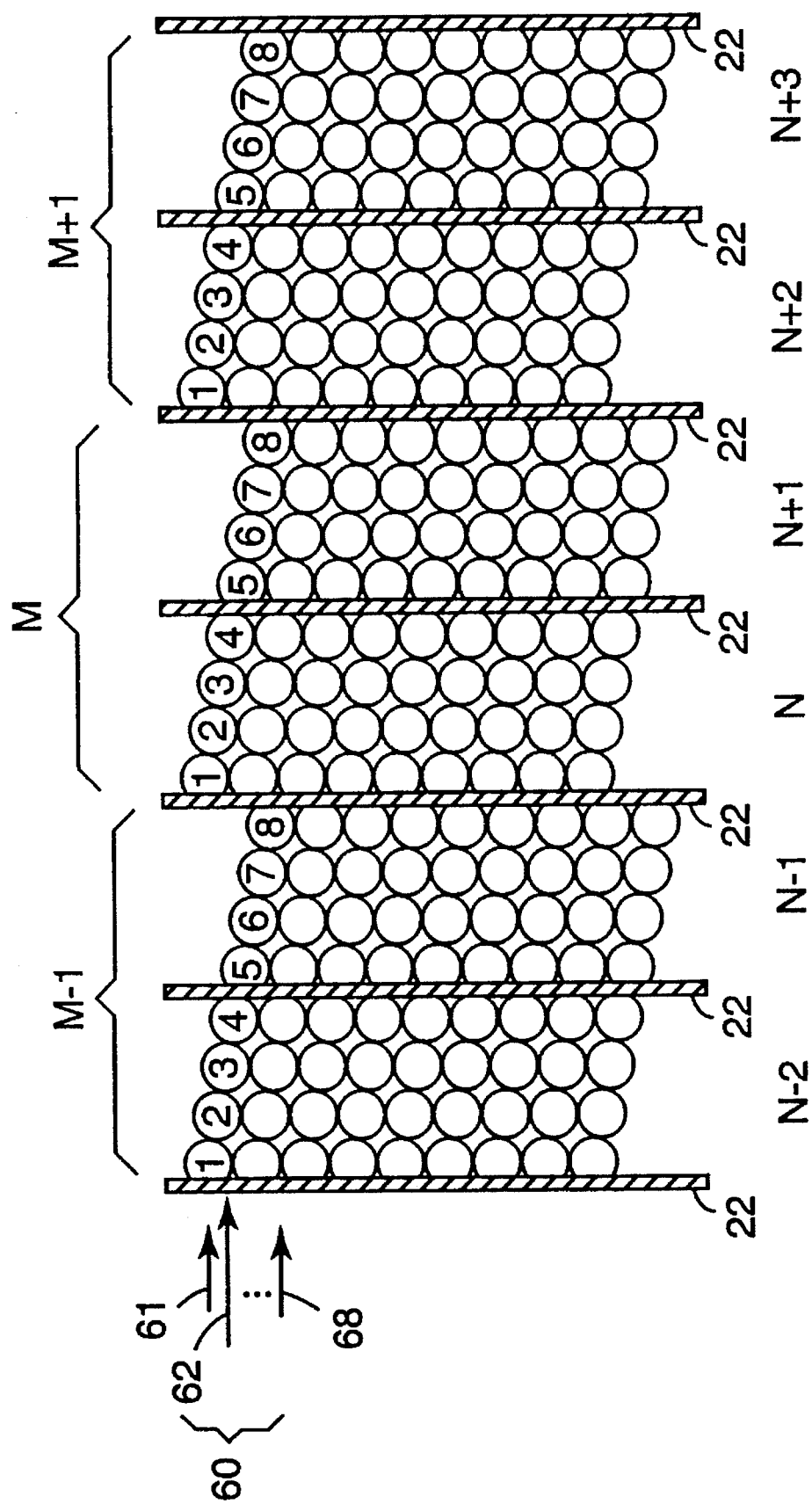
FIG. 2 is a diagram illustrating the placement of scanning pixels with respect to readout electrodes of a photoconductive structure.

Referring now to FIG. 2, a portion of the photoconductive structure 10 is shown in a diagrammatic view, at a greatly enlarged scale, to illustrate the location of scan spots, or pixels, with respect to six adjacent electrodes. For example, these could be electrodes 20a-20f from the forward and leftmost portion of the conductive plate as illustrated in FIG. 1. However, in general, they could be any adjacent electrodes, so they have been labeled electrode N− 2 through electrode N + in FIG. 2. Reference number 22 indicates the small gaps between adjacent electrodes, represented in FIG. 2 as vertical bars.

In FIG. 2, the compact circular patterns repeated across the figure represent individual scan spots. In the embodiment shown, four scan spots fit in the width of an electrode, and a scan line for the image is made up of 8 sub-scans. A single scan line is genes:ally indicated by reference 60. It is made up of eight separate sub-scans 61–68 which correspond to the number of pixels 1–8 for each of the scan line segments. For purposes of discussion, a scan line 60 is also broken up into line segments, labeled segment M−1, segment M, and segment M+1. In a perfect alignment situation such as that represented in FIG. 2, each segment lines up on a pair of the electrodes, so that each of the pixels 1, 2, 3, 4 for a line segment fall directly over an electrode, and pixels 5, 6, 7, 8 for the line segment fall directly on the adjacent electrode.

While eight sub-scans for a line are shown, with four scan spots corresponding to the electrode width, it will be appreciated that in general these are arbitrary, and different numbers could be used for each. This would depend upon the size of the pixel in relationship to the width of the electrode strip. In the preferred embodiment, 8 or 16 sub-scans would be used, and eight are shown in the figures for purposes of clarity of illustration.

As the optical scanning head 50 sweeps the beam position across the photoconductive structure 10, it is pulsed to produce a predetermined pattern and sequence for the pixels. In a preferred embodiment illustrated in FIG. 2, the first sub-scan 61 would produce a spot in the position indicated by pixel 1 in segment M−1, then skip to produce a spot for pixel 1 in segment M, and so on across the whole width of the image area of the photoconductive structure 10. In this manner the scan head 50 lays down a pattern of spots in pixel 1 position for every segment to complete the first sub-scan.

The second sub-scan 62 then proceeds and places the pixel spot at position 2 for segment M−1, then position 2 for segment M and so on, for each of the segments. Each pixel 2 is spaced adjacent its corresponding pixel 1, and downward by ⅛ of a pixel (in the case of an eight-pixel segment). Subsequently, pixels 3, 4, 5, 6, 7, and 8 are laid down to complete a scan line. As this is happening, the plate holder or cassette 40 is being moved upwardly in the orientation of FIG. 2 (toward the left in the orientation of FIG. 1), so that a subsequent scan line consisting of eight scans will be placed down to fill in the next row across and so forth until the entire image area has been scanned.

As previously mentioned, the charge movements caused within the photoconductive structure by the radiation from a scan spot do not travel only downwardly to an electrode, but also have induced field effects and have a certain amount of migration or transverse movement. Thus, while most of the charge movement produced by spot 3 of a sub-scan in FIG. 2 will be detected by the electrode immediately under it, such would not be the case for those which are nearer an electrode boundary. For example, scan spots of sub-scan 4 in segment M−1 can be expected to produce charge which will be detected both by electrode N−2 and electrode N−1. Thus, it is necessary to receive charge through amplifiers connected to both of these electrodes during the relevant period for this sub-scan 4, segment M−1. These charge components can then be stored and later combined in order to give the correct value of charge movement for this pixel. In general, it is advantageous to receive charge components not only for the electrode beneath a particular scan spot, but also for the closest adjacent electrode.

Note also that the sub-scan pattern of dots as illustrated in FIG. 2 is not the only one that could be used, but in general, any combination or order of sub-scan sequences is also possible.

The above description of the scan pattern with reference to FIG. 2 is for a nominal or ideal situation in which the photoconductive structure is accurately positioned in known relationship to the scan pattern that will be generated by the scan head 50, resulting in the scan segments with the eight pixels generated in the sub-scan all falling exactly over the intended pair of strip electrodes. However, as previously mentioned there can be errors in tolerances in positioning of the photoconductive structure 10 on the holder or cassette 40, and while these errors can be minimized through careful design and manufacture of components, there will still be errors which can be significant compared with the very small dimensions of the pixels and the strip electrodes. This can create errors in the scanning and picture forming process.

Figure 3A:
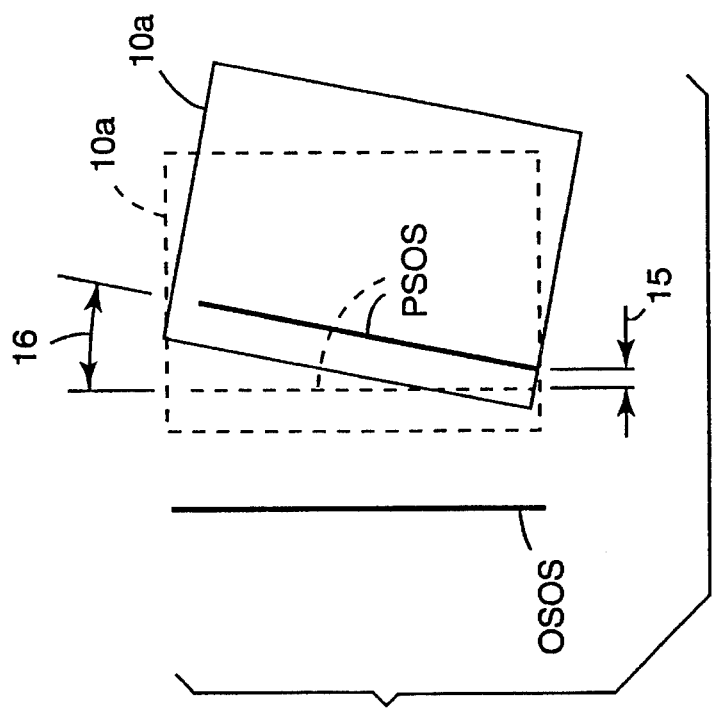
FIG. 3a is a diagram illustrating errors in positioning of a photoconductive structure in a scanner.

The nature of these errors is shown in exaggerated form in FIG. 3a. In FIG. 3a, the line labeled "OSOS" indicates the position in space of the optical start of scan. This is a definite position, relative to the position of the scan head 50, at which each scan line starts. Together, the OSOS for all the scan lines across the photoconductive plate are indicated by the vertical line OSOS in FIG. 3a. Reference number 10n indicates in dotted line, the preferred or nominal position of photoconductive structure 10 when placed in holder 40 in known position with respect to scan head 50, and specifically with respect to scan head 50 OSOS position.

Reference number 10a shows a rectangle in solid line, indicating the actual positioning of a photoconductive structure 10 for a scanning operation, with positioning errors greatly exaggerated for purposes of illustration. The reference strip 30 for photoconductive structure 10 is indicated by the designation PSOS, in solid line for 10a, and in broken line for 10n.

Figure 3B:
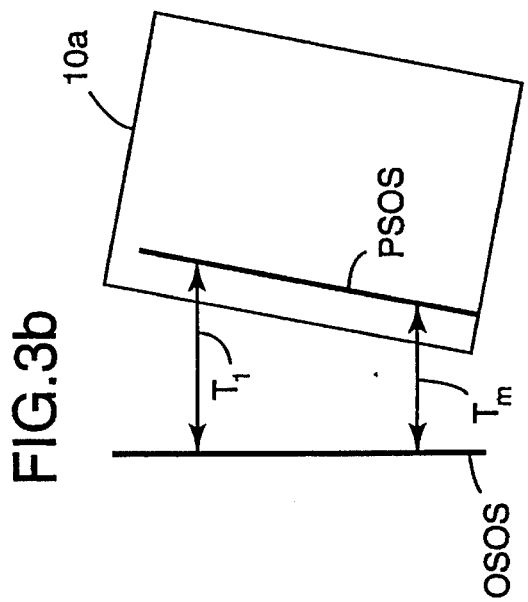
FIG. 3b is a diagram similar to FIG. 3a illustrating the measurement of positioning errors by measuring line skew.

Generally speaking, the positioning errors for photoconductive structure 10 can be thought of as being an offset in the left-right sense of FIG. 3a, indicated by dimension 15, and a rotation angle indicated by reference number 16. Note that offsets in the vertical sense of FIG. 3a are not significant, since that direction generally aligns with the lengthwise orientation of the electrodes. While the offset measurement 15 and rotation 16 provide one way of measuring positioning errors, in practice it has been found advantageous to measure scan line displacement, herein referred to as skew, at a number of different scan lines along the photoconductive structure 10. This is illustrated in FIG. 3b, where photoconductive structure 10a is once again positioned in error with respect to the OSOS. However, this time the measurement and compensation for the error is in terms of a number of skew measurements T1 through Tm from the OSOS to the PSOS for different scan lines along the plate. In this manner the rotation/translation is modeled as a simple skew or translation per image line, thereby linearly approximating the rotation angle.

Figure 4:
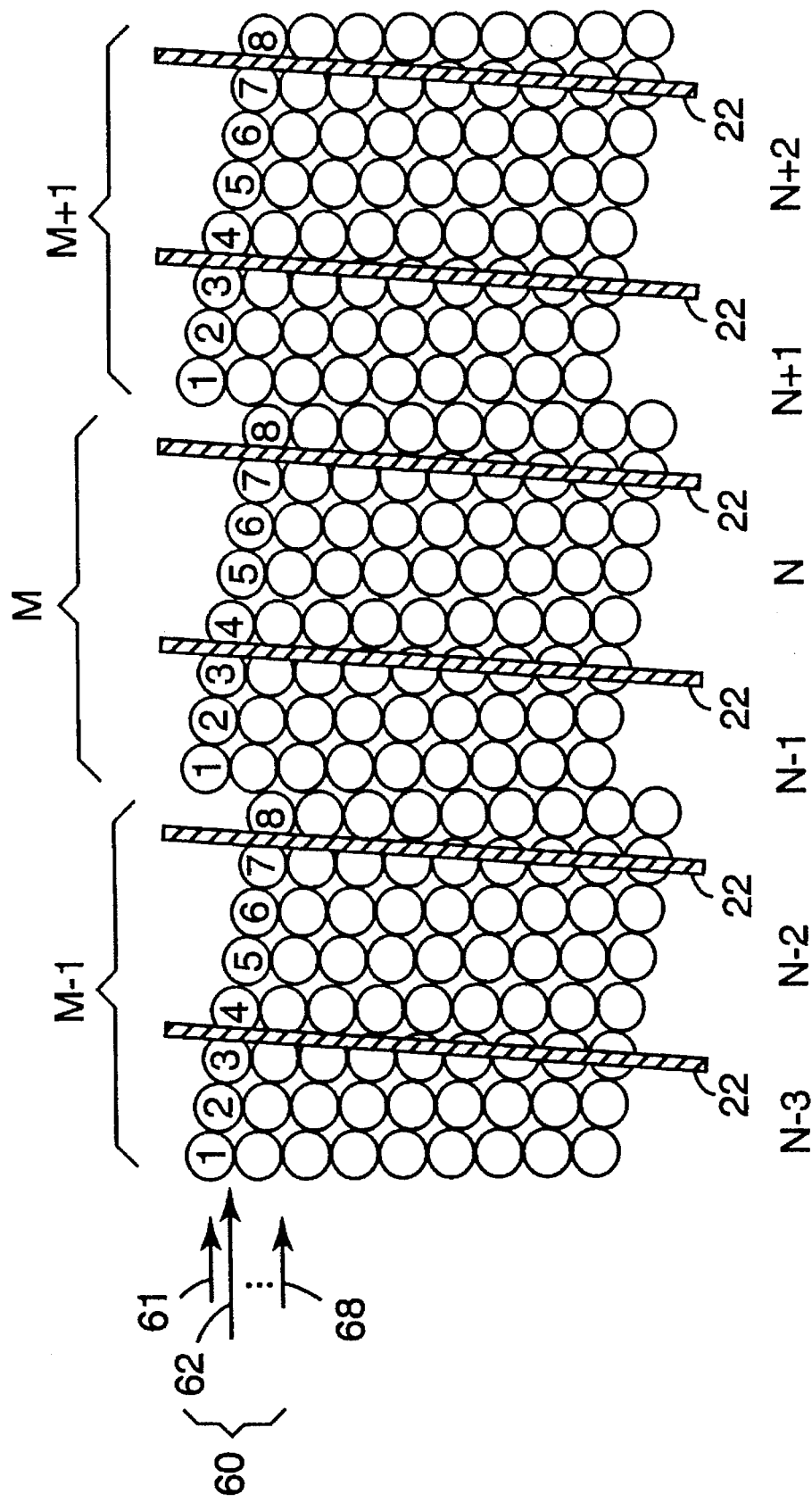
FIG. 4 is a view similar to FIG. 2, but for the situation wherein the photoconductive structure is displaced with respect to the expected position of the scan pattern.

The effect of positioning error is illustrated in FIG. 4. FIG. 4 is a view similar to FIG. 2, but wherein the scan line segments M−1, M, and M+1 do not line up with electrodes as they did in FIG. 2, due to skew or errors in the positioning of photoconductive structure 10 with reference to the scan pattern that is being projected or laid down by scan head 50. For example, in FIG. 2 the first scan line for the scan segment M overlies electrodes N and N+1. However, in FIG. 4, segment M straddles part of electrode N−1, all of electrode N and part of electrode N+1, with all other neighboring segments correspondingly shifted.

Since the scanning head 50 projects a predetermined pattern across the surface of the photoconductive structure 10 placed underneath it, the sub-scans and segments do not necessarily line up with the electrode strips, if there is skew. This causes changes in the identity of which electrode is under a particular scan spot, and which adjacent electrode is the closest one, whose values should be combined in order to get the true value of the pixel. For example, compare segment M of scan 60 in FIG. 2 and FIG. 4. Note that in FIG. 4 spots 1, 2, and 3 of segment M actually fall on electrode N−1 rather than electrode N. Spot 8, while still falling over electrode N+1, is closer to electrode N in FIG. 4 rather than electrode N+2 in FIG. 2. This means that in order to obtain the proper value of charge signal for spot 8 of segment M in the first line of FIG. 4, one should combine the values obtained for electrodes N and N+1. This is in contrast to the perfect alignment case of FIG. 2, wherein for that same spot one should combine the values obtained for electrodes N+1 and N+2.

Note also that because of the tilt or rotation evident in FIG. 4, the skew will change eventually as the scan proceeds down the plate, such that for example, the spot for sub-scan 5 is closest to the adjacent electrode on the left, for scans at the top of the figure, but as the scan lines proceed lower, eventually the spot for sub-scan 5 will become closer to the adjacent electrode on the right. Thus, it is necessary to determine skew at more than one point in order to obtain good data for compensation.

Skew Measurement

In FIG. 1, reference number 35 generally indicates the skew measurement system according to the present invention. A data path indicated by reference number 34 conveys data from scanning head 50 to skew measurement system 35. Data path 36 conveys data from skew measurement system 35 to the data processing system 47. The data processing system 47 includes a skew compensation system, responsive to the skew measurement system, that is operative to provide an indication of which electrode and which adjacent electrodes correspond with individual scan spots. The charge movements received by the respective electrodes can then be combined to form the correct charge value for the image pixel represented by the scan spot.

Means are provided in scanning head 50 for measuring the OSOS, and tracking the position of the scanning beam across the scanning area. In the preferred embodiment of the scanning head as discussed above, this takes the form of an optical grating which is used for controlling the pulsing of the scanning laser in order to produce the scanning spot pattern, previously described. In addition, for purposes of the present invention, this tracking system is used to measure by time or distance the skew measurement from OSOS to PSOS. With reference to FIG. 1, this skew measurement is from the beam path indicated by reference number 55, to the beam path indicated by reference number 56. In FIG. 3b, it is the distance indicated by any of the time measurements T1–Tm.

The optical grating within the preferred scanning head 50 can be swept by a companion control laser aligned in known relationship to the scanning laser, so as to accurately track its motion. It can provide an output in the form of a pulse train that can be counted to provide a measure of distance, and to control the pulsing of the scan laser. In addition, a photosensor 51 is provided in scan head 50 to detect the reflectance from reference marker 30. It will be appreciated that skew measurement system 35 can be implemented in hardware, software, or a combination of both, as will be readily apparent to those skilled in the art from the following descriptions, with reference to the waveforms of FIG. 5.

Figure 5:
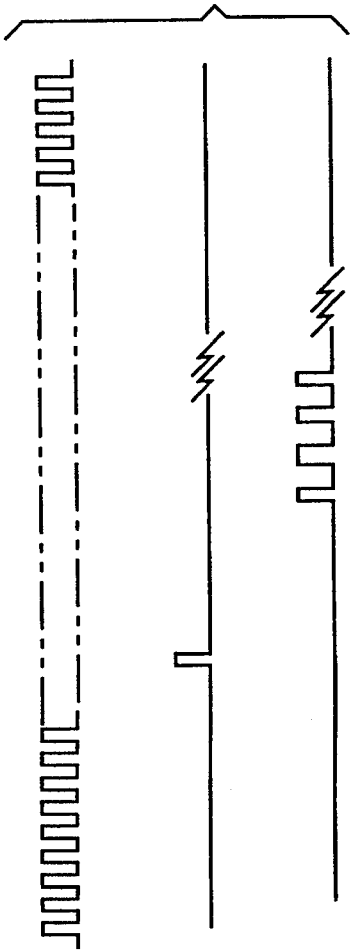
FIG. 5 is a timing diagram showing the measurement of line skew.

In FIG. 5, the top trace represents the grating clock pulses in the scanning head. They begin for each scan line at the OSOS as indicated in the figure, and continue throughout the scan. The second trace shows a pulse at the point that the scanning beam first contacts the reference strip 30, which reflects light back to the scanning head and is detected as the PSOS. The third trace shows a number of pulses that are derived from the grating clock and are used to control the pulse scanning laser to lay down the pattern of scan spots, previously described.

Of interest is the relationship between OSOS and PSOS, which is in terms of a number of counted pulses, but which corresponds to distance. Any deviation of this count from a standard would represent skew for the line as a result of positioning errors. It is therefore possible to measure this skew pulse count for each scan, and determine skew of the plate. However, for a number of reasons, it is better not to measure every line, and to provide various types of filtering for this measurement, prior to usage.

For one thing, the change in skew from one line to the next is likely to be negligible, probably much less than the resolution of one count of the grating count, since the amount of expected offset change is very small. It is therefore only significant to measure the offset after a number of lines, for example every 64th line, which would correspond to every 64×8 sub-scans. This still provides a close enough measurement of any plate offset or rotation, and reduces the amount of data that is needed to be handled for the skew measurement. Also, it is generally not desirable to have the laser on at each path from the OSOS to the PSOS, as there might be the possibility of some stray radiation or scatter which could provide some additional unwanted exposure on the image. Therefore, controls are provided for taking the OSOS-PSOS measurement only every nth scan line along the plate, as the scan continues.

Filtration of the plate skew values.

After the entire photoconductive plate is scanned and appropriate charge movements are acquired and stored in a memory (not shown) associated with data processing system 47, a skew compensation system forming part of the data processing system processes the stored data based on the skew measurements made by skew measurement system 35 to produce an accurate digital representation of the latent image.

The data from the plate is precise to only ±1 pixel resolution. There will therefore be some noise in the acquisition process which must be removed by data processing system 47. Two steps are used in the preferred embodiment: first by removal of statistical outliers, then by low pass filtering. Statistical outliers are abnormally high or low readings which may be caused by errors or defects. For example, if the laser detects and responds to a speck of dust on the photoconductive structure prior to the PSOS reference strip 30, this would produce an erroneously low count data point. In case there was a void or other imperfection in the PSOS reference strip 30 at the location of a scan line, this could result in an erroneously long count data point. To remove such noise the raw data is median filtered. The median filtering window size is arbitrary and the ideal size may need to be determined by experimentation for a given system design.

Using the filtered data, the skew compensation system of data processing system 47 renders a least-squares estimate of the entire plate's translation (in the direction in which skew is being measured—not the translation in direction 41) due to positioning errors (called XOFF) and calculates the incremental plate translation per image line (called DX) using standard linear algebra techniques.

XOFFSET calculation per image line.

The XOFFSET, i.e., the overall plate translation plus translation due to the skew (rotation) for each image line is calculated by the skew compensation system. A machine setup dependent value which is called SETUP is also used to calculate XOFFSET. SETUP is determined experimentally for each scanning machine setup, but once determined, is a constant for that machine setup. It is a measure of the cassette to scanning head offset for that machine. The equation is XOFFSET=SETUP−XOFF+DX * line_number.

Left electrode calculation.

The skew compensation system of data processing system 47 performs a left electrode calculation using the sub-scan sequence information to address a particular portion of the image corresponding to the data acquired for the sub-scan (e.g. sub-scan number * 256 samples/sub-scan for a small cassette provides the memory address of the first sample for that sub-scan). To the basic left electrode calculation, floor ((XOFFSET+the sub-scan sequence number— 1)/4) is added. FLOOR is a mathematical function returning the integer less than the floating point value.

The need for this additional factor is best seen by looking at FIGS. 2 and 4 with the laser spots for each sub-scan marching across the electrodes. We assume that any laser spot on the left half of electrode N will be sampled by electrode N−1 and N while any laser spot on the right half of electrode N will be sampled by electrodes N and N+1. Since there are 4 sub-scans per electrode strip, dividing the sub-scan by 4 produces the base value of M. Subtracting 1 produces the left electrode sample (e.g. sub-scan 0 should have a left electrode of −1). The FLOOR function calculates the integer left electrode value. The XOFFSET value is simply added to support non-ideal electrode placement caused by translation of the plate from the nominal position.

Minimum and maximum calculation.

A conceptual simplification used above and in the implementation is allowing left electrodes with values less than 0 and greater than 255. However, since there is no sampled data outside the range [0,255], a minimum and maximum left electrode value is calculated to avoid using an incorrect block of memory. Thus, for the I-th sub-scan, the minimum allowable data block address is I−1 * 256 and the maximum is I * 256. Again the value of 256 is specific to this implementation but is arbitrary in general.

Sample combination.

The stored samples for the left electrode address and the left electrode address +1 are added by the skew compensation system if and only if both addresses are between the minimum and maximum block range calculated above. If any address lies outside this range, a value of 0 is arbitrarily assumed. The calculations are illustrated in the following sample C language code that is executed by the skew compensation system to appropriately combine charge movements detected at adjacent electrodes.

```
XOFFSET = (double) (SETUP) − (XOFF +
(line_number * DX)/2.0));
for (i = 0; i < 8; i++)
{
        electrode[i] =    (double)(seq[i] * n)/4 +
        (int)floor((XOFFSET + seq[i] − 1.) / ((float)8/2.0));
    e_max[i] = ((i+1) * n)/8;
    e_min[i] = (i * n)/8;
}
for (j = 0; j < number_of_electrodes; j += 2)
    {
    for (i = 0; i < 8; i++, out++)
    {
        int ej = electrode[i] + j;
        if (ej < e_min[i]) /* off left edge of plate */
            *out = 0;
        else
            *out − *(in + ej);
        if (ej + 1 >= e_min[i] && /* not off left edge */
            ej+1 < e_max[i]) /* not off right edge */
```

```
            -continued
       *out += *(in + ej + 1);
     }
   }
}
```

Where, in the above code, the following definitions apply:

line_number is defined as the image line number;

seq[i] is a vector containing the spot sequence information. For example, for the spot sequence in FIG. 4 the vector would contain [1,2,3,4,5,6,7,8];

electrode[i] is defined as the left electrode (N in FIG. 4) to be used when calculating the $n^{th}$ value;

e_max[i] is the maximum index for sub-scan I;

e_min[i] is the minimum index for sub-scan I;

ej is defined as the left electrode (N–3 for the example in FIG. 4) for the laser spot of sub-scan i.

j=M/2, for the example of FIG. 4;

in is a pointer to the input data;

*in is the value pointed to by in;

out is a pointer to the output image data;

*out is the value pointed to by out.

The foregoing explanation illustrates how line skew measurements are taken, the data is filtered, first by removal of statistical outliers, then by low pass filtering. Calculations are then performed to determine whether pixel values are to be combined for the adjacent electrode to the left or right. Following these calculations, the previously stored electrode charge values can then be properly combined to form the digital representation of the scanned image. This digital representation can be viewed or printed on an output device as desired.

I claim:

1. A system for constructing an accurate digital representation of a latent image formed on a photoconductive structure of the type having a plurality of elongate readout electrodes, where the photoconductive structure may be skewed from a predetermined position with respect to the system, comprising:

a data collection system for scanning the photoconductive structure in a pattern of scan spots and collecting data from the readout electrodes;

a skew measurement system for measuring skew in the positioning of the photoconductive structure with respect to the scan pattern;

a system for assembling a digital representation of the image, including means for determining from said skew measurement which electrode and which adjacent electrode correspond to said scan spots, and combining the data collected from the electrodes in accordance with said determination, to assemble a digital representation of the latent image.

2. A system according to claim 1 wherein said photoconductive structure includes a reference mark in predetermined relation to the electrodes, and wherein the skew measurement system includes a sensor for detecting the position of the reference mark.

3. A method for constructing an accurate digital representation of a latent image formed on a photoconductive structure of the type having a plurality of elongate readout electrodes, where the photoconductive structure may be skewed from a predetermined position with respect to the system, comprising the steps of:

collecting data by scanning the photoconductive structure in a pattern of scan spots and receiving data from the readout electrodes;

measuring skew in the positioning of the photoconductive structure with respect to the scan pattern; and assembling a digital representation of the image, by determining from said skew measurement which electrode and which adjacent electrode correspond to said scan spots, and combining the data collected from the electrodes in accordance with said determination, to thereby assemble a digital representation of the latent image.

4. A method according to claim 3 wherein said photoconductive structure includes a reference mark in predetermined relation to the electrodes, and wherein said step of measuring skew includes detecting the position of the reference mark with respect to the pattern of scan spots at a plurality of locations along the photoconductive structure.

5. A method according to claim 4 wherein said step of measuring skew includes the step of filtering the data which represents the detected position of the reference mark at said plurality of locations, to remove statistical outliers.

6. A method according to claim 5 wherein said step of filtering includes median filtering of the data.

7. A method according to claim 4 wherein said step of measuring skew includes the step of filtering the data which represents the detected position of the reference mark at said plurality of locations, with low pass filtering.

8. The method of claim 7 wherein said low pass filtering comprises making a least-squares estimate of the skew data.

9. A reader for readout and construction of an accurate digital representation of a latent image formed on a photoconductive structure of the type having a plurality of elongate electrodes, comprising:

a scanner for scanning a photoconductive structure positioned with respect thereto in a pattern of scan spots thereacross;

holder apparatus for holding a photoconductive structure and translating it through the scan pattern during a scanning operation;

charge signal receivers operatively connected to said electrodes for receiving charge signals therefrom caused by said scanning operation;

a memory connected for storing said charge signals received by said electrodes;

a skew measurement system for measuring skew in the positioning of the photoconductive structure in said holder apparatus with respect to the scan pattern produced by said scanner;

means for calculating from said skew measurement which electrodes and which adjacent electrodes are closest to individual scan spots of said pattern; and means for combining selected ones of the stored charge signals received by said electrodes in accordance with said electrode calculation, so as to assemble an accurate digital representation of the latent image.

10. A system for compensating for positioning skew errors in the scanning of images formed on photoconductive structures, comprising:

a photoconductive structure capable of holding a charge distribution of a latent image to be scanned and read out, said photoconductive structure having a plurality of electrodes for collecting charge movements caused by the scanning;

a scanner for applying readout radiation in patterns of scan spots to the photoconductive structure to cause the charge movements which are collected by the electrodes;

a support for receiving the photoconductive structure and holding the photoconductive structure in relation to the scanner;

a skew measurement system for measuring errors in positioning of the electrodes with respect to the patterns of scan spots; and a skew compensation system responsive to said skew measurement system and operative to provide an indication of which electrode and which adjacent electrodes correspond with the scan spots, so that the charge movements collected by the electrodes can be combined to form the correct charge value for the image area represented by the spot.

11. A system according to claim 10 wherein said photoconductive structure includes a reference mark in predetermined relation to the electrodes, and wherein the skew measurement system includes a sensor for detecting the position of the reference mark.

12. A system for compensating for positioning skew in the scanning of a digital representation of an image formed on a photoconductive structure, comprising:

a photoconductive structure, capable of holding an imagewise charge distribution of a latent image to be scanned and converted to a digital image representation;

said photoconductive structure having a plurality of electrodes for collecting charge movements caused by the scanning;

said photoconductive structure having a reference mark indicating a start of the scanning;

a scanner for scanning across the photoconductive structure in scan patterns of successive pulsed spots of radiation, the pulsed spots of radiation corresponding to pixels of the latent image;

a support for receiving the photoconductive structure and holding the photoconductive structure in relation to the scan patterns of the scanner;

circuitry coupled to said electrodes for receiving and storing signals representing the charge collected by the electrodes due to the pulsed spots of the scanning, said circuitry including multiple amplifier channels synchronized with the scanner so that the amplifier channels associated with a respective one of the electrodes under an expected position of one of the pulsed spots and at least one of the electrodes adjacent to the respective one of the electrodes are operative for receiving charge movements caused by a scan spot;

a skew measurement system for measuring the distance between the start of one of the scan patterns of successive pulsed spots and said reference mark for a plurality of said scan patterns along the photoconductive structure as a measure of errors in the positioning of the photoconductive structure in said support and displacement of the scan patterns of pulsed spots from expected positions with respect to said electrodes; and a skew compensation system responsive to said skew measurement system and operative to provide an indication of which electrode and which adjacent electrodes correspond with individual scan spots, so that the charge movements received thereby can be combined to form the correct charge value for the image pixel represented by the spot.

13. A system according to claim 12 wherein the scanner is a pulsed laser scanner.

14. A system according to claim 12 wherein said patterns of successive pulsed spots of radiation include multiple sub-scans for each scan line of pixels.

15. A method for compensating for skew or offset positioning errors in the scanning and digital readout of charge distribution images from photoconductive structures of the type having a plurality of elongate strip readout electrodes, comprising the steps of:

positioning the photoconductive structure in a holder within an area for scanning by a scanning assembly;

scanning across the photoconductive structure with patterns of radiation spots corresponding to pixels to be read out;

for each scan pattern, receiving and storing charge signals caused by each spot, from the readout electrode expected to be positioned under the spot and at least one adjacent readout electrode;

measuring the distance from a reference start-of-scan position to a position where the scan reaches a reference having a known relation to the positions of the electrodes on the photoconductive structure, for a plurality of scan patterns along the photoconductive structure;

determining from the measured distance the amount of skew error from the expected positioning of the photoconductive structure with respect to the scanned pattern of radiation spots, and determining from said skew error, which readout electrodes were closest to each scan spot, so that their corresponding received charge signals can be combined to obtain the correct charge value for the pixel represented by the spot.

16. The method of claim 15 wherein the step of measuring said distance includes scanning an optical grating with a beam of radiation, said beam of radiation being aligned in a known relationship to said pulses corresponding to the movement of the scan position of said radiation spots, and counting said pulses between start-of-scan position to a position where the scan reaches said reference on the photoconductive structure.

17. The method of claim 16 wherein said distance measurements are taken for a plurality of scans across the photoconductive structure, and further including the step of filtering the counted pulses to remove statistical outliers.

18. The method of claim 17 wherein said step of filtering comprises median filtering.

19. The method of claim 15 wherein said distance measurements are taken for a plurality of scans across the photoconductive structure, and further including the step of filtering the data which represents the counts corresponding to the measured distances, with low pass filtering.

20. The method of claim 19 wherein said low pass filtering comprises making a least-squares estimate off, he skew for the image scan lines.

* * * * *

UNITED STATES PATENT AND TRADEMARK OFFICE
CERTIFICATE OF CORRECTION

PATENT NO. : 5,479,006       Page 1 of 2
DATED : December 26, 1995
INVENTOR(S) : Schultz It is certified that error appears in the above-indentified patent and that said Letters Patent is hereby corrected as shown below:

Column 4, line 27, delete "tong" and insert --long--.

Column 5, line 49, delete "N⨥" and insert --N+3--.

Column 5, line 57, delete "genes:ally" and insert --generally--.

Column 10, line 51, delete "(SETUP)" and insert --(SETUP--.

Column 11, line 17, delete "the laser spot" and insert --the j$^{th}$ laser spot--.

Column 14, line 58, delete "off, he" and insert --of the--.

UNITED STATES PATENT AND TRADEMARK OFFICE
CERTIFICATE OF CORRECTION

PATENT NO. : 5,479,006
DATED : December 26, 1995
INVENTOR(S) : Schultz

It is certified that error appears in the above-indentified patent and that said Letters Patent is hereby corrected as shown below:

Column 14, line 41, after the word "said" and before the word "pulses", insert --radiation spots, said optical grating generating grating--.

Signed and Sealed this

Twenty-eighth Day of May, 1996

Attest:

BRUCE LEHMAN

*Attesting Officer*     *Commissioner of Patents and Trademarks*